United States Patent [19]
Nishioka et al.

[11] Patent Number: 5,851,376
[45] Date of Patent: Dec. 22, 1998

[54] CATALYST DEGRADATION DETERMINATION APPARATUS AND METHOD

[75] Inventors: Futoshi Nishioka, Hiroshima; Seiji Yashiki, Hiroshima-ken; Tetsushi Hosokai, Kure, all of Japan

[73] Assignee: Mazda Motor Corporation, Hiroshima-ken, Japan

[21] Appl. No.: 754,090

[22] Filed: Nov. 20, 1996

[51] Int. Cl.$^6$ .................................................. G01N 27/407
[52] U.S. Cl. .......................... 205/784.5; 60/276; 60/277; 60/299; 60/302; 204/424; 204/425; 205/790.5; 205/791.5
[58] Field of Search ..................................... 204/421–429; 205/783.5, 784, 784.5, 785, 790.5, 791.5; 60/276, 277, 299, 302

[56] References Cited

U.S. PATENT DOCUMENTS 5,472,580  12/1995  Kennard et al. .......................... 204/421

FOREIGN PATENT DOCUMENTS 57-2896   1/1982   Japan .
6-280547  10/1994  Japan .

*Primary Examiner*—T. Tung

[57] ABSTRACT

A catalyst degradation determination apparatus having $O_2$ sensors provided at the upstream and downstream of a catalyst, detects degradation of the catalyst by, during A/F ratio feed-back control since an engine has been started, comparing an integrated value of output values from the upstream $O_2$ sensor with that of output values from the downstream $O_2$ sensor. Upon starting integration of the output values from the respective $O_2$ sensors, change of activated status of the catalyst is judged. If the status of the catalyst is approximately the same as a previous status, the integration is started with previous integrated values. On the other hand, if the status of the catalyst is different from the previous status, the previous integrated values are reset, and the integration of the output values from the respective $O_2$ sensors is started from the beginning. This prevents erroneous catalyst degradation determination.

15 Claims, 12 Drawing Sheets

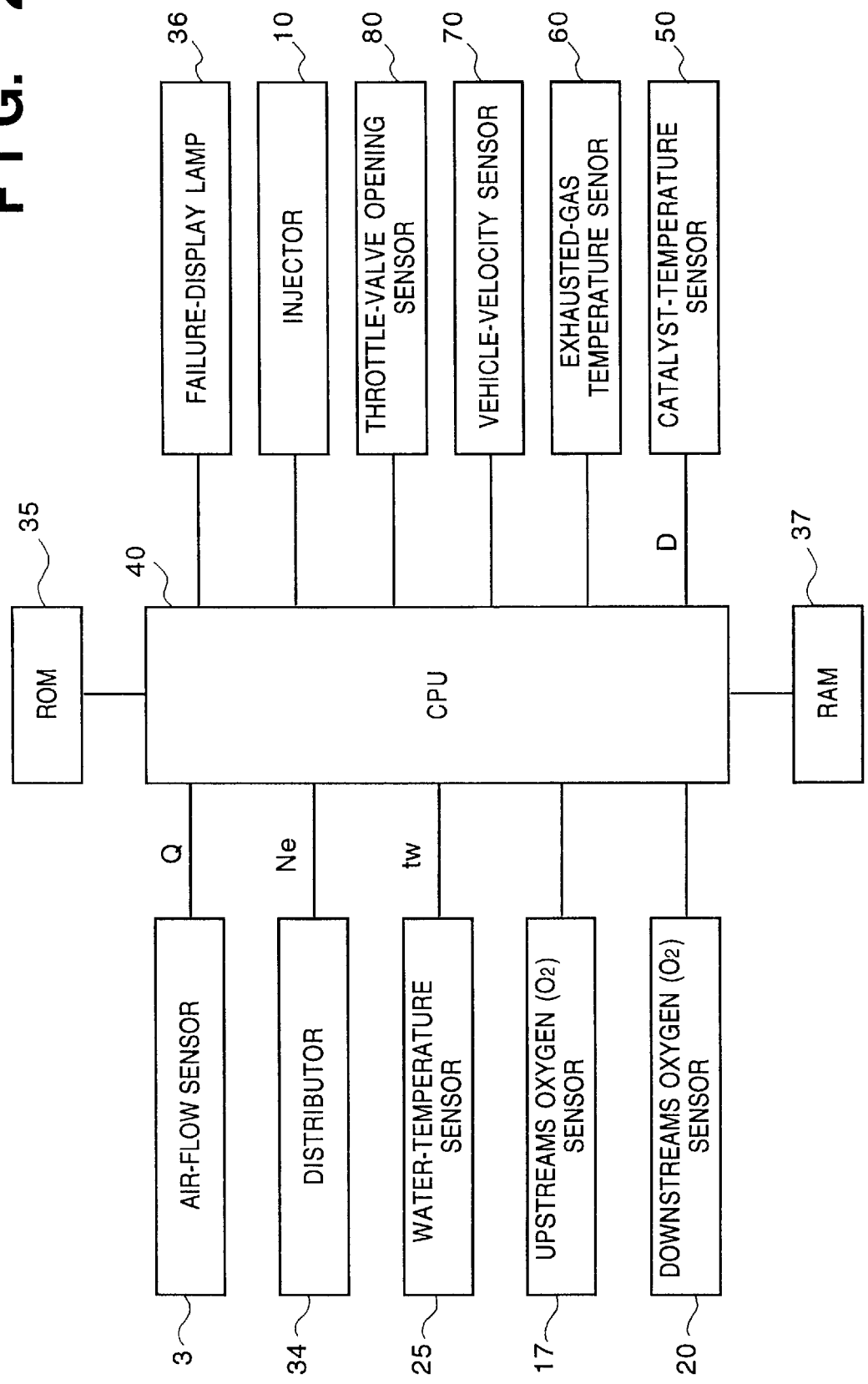

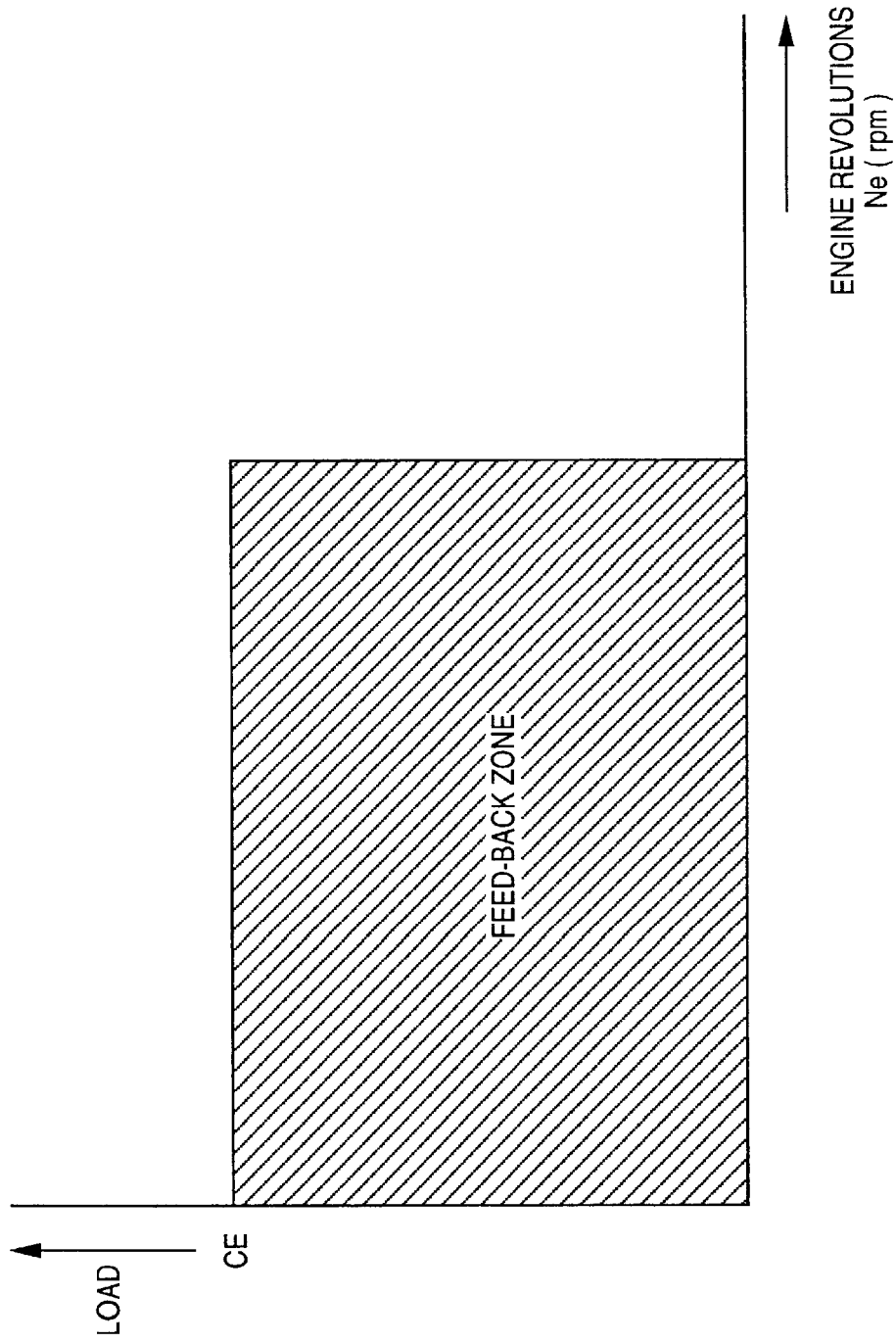

F I G. 4A
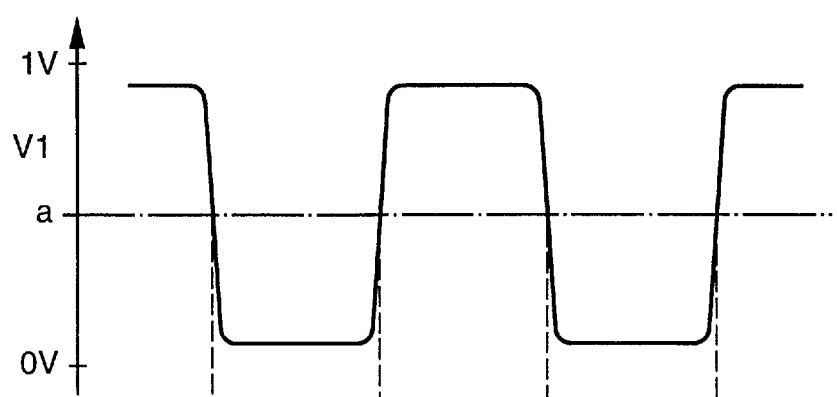
F I G. 4B
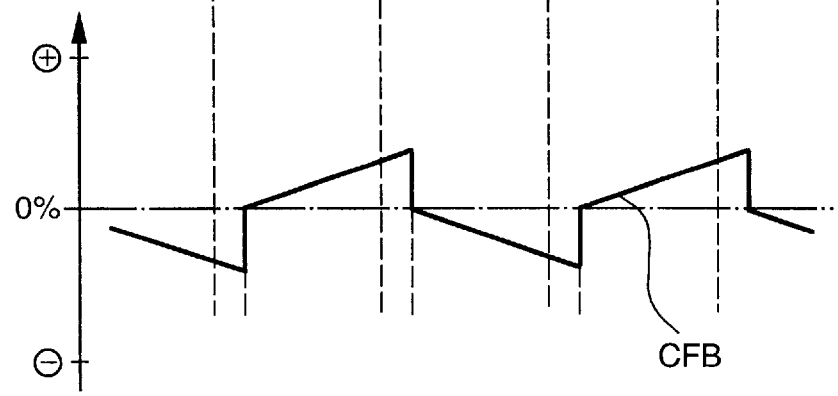

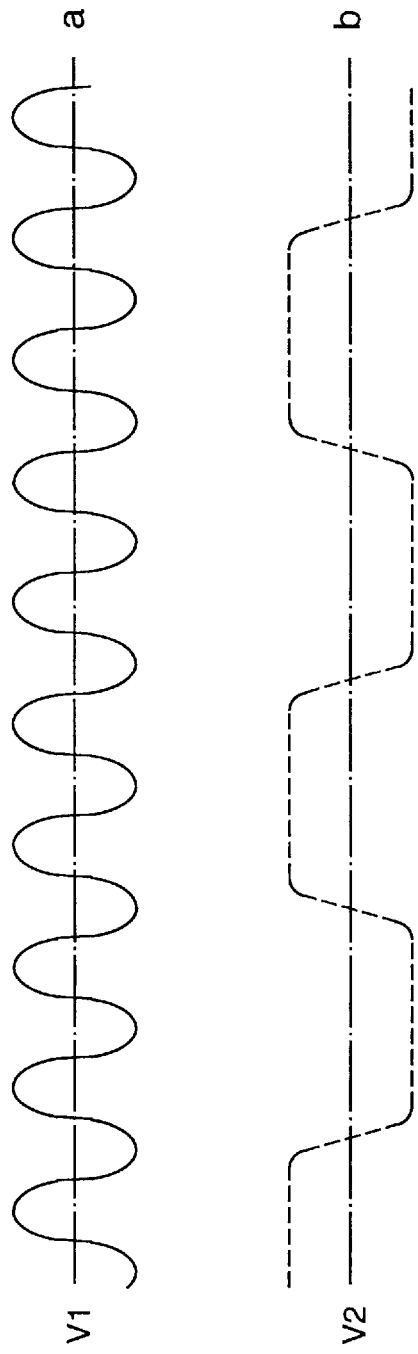

CATALYST DEGRADATION DETERMINATION APPARATUS AND METHOD

BACKGROUND OF THE INVENTION

This invention relates to a catalyst degradation determination apparatus having an A/F (air by fuel) ratio sensors for detecting an A/F ratio in the exhaust, respectively at an upstream position and a downstream position of a catalyst, and determining degradation of the catalyst based on detected values from the respective A/F ratio sensors, and a catalyst degradation determination method.

Conventionally, in a vehicle engine, an A/F ratio sensor which detects an A/F ratio in the exhaust is provided at an upstream position of a catalyst, and based on the detection values from the A/F ratio sensor, A/F ratio feed-back control is performed on a fuel-injection amount so that the fuel-injection amount becomes closer to a logical A/F ratio. An A/F ratio is represented by a weight ratio of air with respect to fuel, to indicate the density of mixture of gas sucked into a combustion chamber. A logical A/F is, in weight ratio, 15:1.

As shown in FIG. 4A, in this feed-back control, a predetermined judgment level a is set at an intermediate position of an amplitude change in an output voltage V1 of the A/F sensor output. At a point where the level of the output voltage V1 raises from a lean mixture side, crossing the judgment level a, to a rich mixture side, "rich judgment" is performed. At a point where the level of the output voltage V1 falls from the rich mixture side, crossing the judgment level a, to the lean side, "lean judgment" is performed. Then, a feed-back control constant CFB as shown in FIG. 4B is varied based on the results of the rich judgment and the lean judgment. The feed-back control by the feed-back constant CFB is delayed by a predetermined time after the rich judgment or the lean judgment, based on the degradation condition and the delay of response of the A/F ratio sensor.

Further, as disclosed in Japanese Patent Publication No. 57-2896, a double A/F ratio sensor system having an A/F ratio (oxygen) sensors for detecting an A/F ratio in exhaust provided at an upstream position and a downstream position of a catalyst, is proposed. When exhaust-purification level of the catalyst is degraded, oxygen storage function of the catalyst is degraded, then, the output from the downstream A/F ratio sensor changes in accordance with the degradation of the storage function. Thus, utilizing the change of the output from the downstream A/F ratio sensor, the degradation of the catalyst is determined based on the result of comparison between the output from the upstream A/F ratio sensor and the output from the downstream A/F ratio sensor.

In this case, as shown in FIG. 4A, with respect to the waveform of the output voltage from the upstream A/F sensor that varies between around 0V (lean) and around 1V (rich), during execution of the A/F ratio feed-back control, the output from the downstream A/F ratio sensor is inverted. At this time, output voltage V2 from the downstream A/F ratio sensor varies as shown in FIG. 5B. In a case where the A/F ratio feed-back control is stopped, an open-loop control where the A/F ratio is switched at a predetermined period, crossing a logical A/F ratio, to the rich or lean mixture side is performed, if the catalyst is not degraded, the oxygen storage function of the catalyst is at a sufficiently high level. Therefore, the waveform of the output voltage of the downstream A/F ratio sensor is continuously on the rich mixture side.

However, in this case, if the catalyst becomes degraded, its oxygen storage function is degraded, then, the waveform of the output voltage from the downstream A/F ratio sensor becomes closer to the waveform of the output voltage of the upstream A/F ratio sensor.

Accordingly, the degree of degradation of the catalyst can be judged by obtaining a ratio between a integrated value of the output voltage values from the upstream A/F ratio sensor and that from the downstream A/F ratio sensor, and by monitoring change of the ratio.

That is, during the feed-back control, the waveform of the output voltage from the upstream A/F ratio sensor varies as shown in FIG. 6A, then the integrated value of the output voltage (hatched portion $\beta$) greatly decreases. When the catalyst is not degraded, the waveform of the output voltage (hatched portion $\gamma$) from the downstream A/F ratio sensor is continuously on the rich mixture side as shown in FIG. 6B. When the catalyst is degraded, the integrated value $\gamma$ of the output voltage decreases as shown in FIG. 6C.

As a conventional art concerning the determination of catalyst degradation, Japanese Patent Application Laid-Open No. 6-280547 discloses a catalyst degradation determination apparatus in which a control gain of a feed-back correction amount is increased upon determination of catalyst degradation, and the difference between the output from an upstream oxygen sensor and that from a downstream oxygen sensor is increased, so as to prevent erroneous judgment on determination of catalyst degradation.

However, in the above technique, when throttle opening/closing operation is frequently made by acceleration operation by a driver, when the throttle which has been open is closed, an amount of exhaust gas which passes through the catalyst decreases, and the temperature of the catalyst is lowered. Accordingly, it can be considered that activated status of the catalyst is degraded. Thus, if conventional catalyst degradation determination is executed in a status where activated status of the catalyst is decreased, the integrated value of the outputs from the downstream oxygen sensor decreases, which may cause erroneous determination.

Furthermore, once catalyst degradation determination is completed even though it is an erroneous detection, the judgment operation is completed at that time, thus precision of the degradation determination cannot be improved since a sufficient number of judgments in a degradation judgment area cannot be ensured.

SUMMARY OF THE INVENTION

The present invention has been made in consideration of the above situation, and has its object to provide a catalyst degradation determination apparatus and method capable of detecting degradation of a catalyst in accordance with change of activated status of the catalyst, while preventing erroneous detection of catalyst degradation, and improving degradation determination precision by ensuring a sufficient number of judgments in a degradation judgment area.

To solve the above problems and to attain the above object, the present invention provides a catalyst degradation determination apparatus which has A/F (air by fuel) ratio sensors respectively provided at an upstream position and a downstream position of an exhaust-purifying catalyst, and which integrates output values from the respective A/F ratio sensors when predetermined degradation determination conditions are satisfied, for determining degradation of the exhaust-purifying catalyst, comprising: holding means for holding integrated values when the predetermined degradation determination conditions are not satisfied during integration of the output values from the respective A/F ratio sensors; integration means for re-starting the integration of the output values with the integrated values held by the holding means when the predetermined degradation determination conditions are satisfied again; judgment means for judging activated status of the exhaust-purifying catalyst; and clearing means for clearing the integrated values held by the holding means, based on the result of judgment by the judgment means.

Further, according to the present invention, the above object is attained by providing a catalyst degradation determination apparatus which has A/F ratio sensors respectively provided at an upstream position and a downstream position of an exhaust-purifying catalyst, and which integrates output values from the respective A/F ratio sensors when predetermined degradation conditions are satisfied, and detects degradation of the exhaust-purifying catalyst by comparing the respective integrated values, comprising: holding means for holding integrated values when the predetermined degradation determination conditions are not satisfied during integration of the output values from the respective A/F ratio sensors; integration means for re-starting the integration of the output values with the integrated values held by the holding means when the predetermined degradation determination conditions are satisfied again; and clearing means for clearing the integrated values held by the holding means if a predetermined period has elapsed since the predetermined degradation determination conditions were not satisfied.

Further, according to the present invention, the above object is attained by providing a catalyst degradation determination method employing A/F (air by fuel) ratio sensors respectively provided at an upstream position and a downstream position of an exhaust-purifying catalyst, and integrating output values from the respective A/F ratio sensors when predetermined degradation conditions are satisfied, for detecting degradation of the exhaust-purifying catalyst, comprising: a holding step of holding integrated values when the predetermined degradation determination conditions are not satisfied during integration of the output values from the respective A/F ratio sensors; an integration step of re-starting the integration of the output values with the integrated values held at the holding step when the predetermined degradation determination conditions are satisfied again; a judgment step of judging activated status of the exhaust-purifying catalyst; and a clearing step of clearing the integrated values held at the holding step, based on the result of judgment by the judgment means.

Further, according to the present invention, the above object is attained by providing a catalyst degradation determination method employing A/F ratio sensors respectively provided at an upstream position and a downstream position of an exhaust-purifying catalyst, integrating output values from the respective A/F ratio sensors when predetermined degradation determination conditions are satisfied, and detecting degradation of the exhaust-purifying catalyst by comparing the respective integrated values, comprising: a holding step of holding integrated values when the predetermined degradation determination conditions are not satisfied during integration of the output values from the respective A/F ratio sensors; an integration step of re-starting the integration of the output values with the integrated values held at the holding step when the predetermined degradation determination conditions are satisfied again; and a clearing step of clearing the integrated values held at the holding step if a predetermined period has elapsed since the predetermined degradation determination conditions were not satisfied.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing a control circuit of the catalyst degradation determination apparatus in the embodiment;

FIG. 3 is an explanatory view of a map stored in a RAM;

FIGS. 4A and 4B are timing charts explaining A/F ratio feed-back control;

FIGS. 5A and 5B are timing charts explaining A/F ratio feed-back control;

DETAILED DESCRIPTION OF THE PREFERRED EMBODIMENTS

Preferred embodiments of the present invention will now be described in detail in accordance with the accompanying drawings.

[General Embodiment]

<Structure of Catalyst Degradation Detecting Apparatus>

Figure 1:
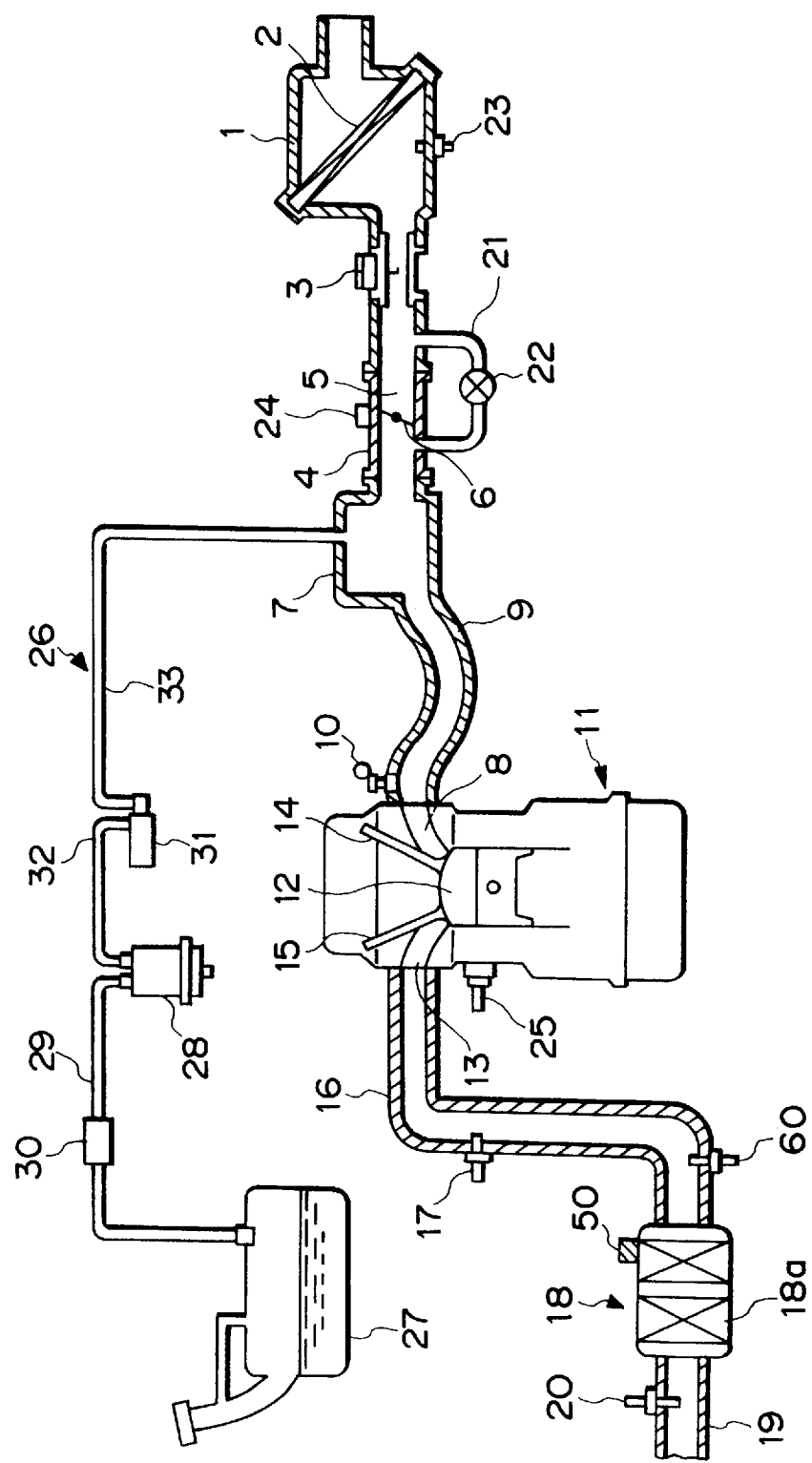
FIG. 1 is a cross-sectional view showing the overall structure of a catalyst degradation determination apparatus according to a general embodiment of the present invention.

First, the structure of a catalyst degradation determination apparatus according to a general embodiment will be described. FIG. 1 shows the overall structure of the catalyst degradation determination apparatus.

In FIG. 1, an air-flow sensor 3 is provided on a downstream side of an element 2 of an air cleaner 1 for cleaning sucked air, and the air-flow sensor 3 is used for detecting an inlet-air amount Q.

A throttle body 4 is connected to the air-flow sensor 3. The throttle body 4 includes a throttle chamber 5 in which a throttle valve 6 for controlling the inlet-air amount Q is provided. A surge tank 7 as an expanded chamber having a predetermined capacity is connected to the inlet path at a downstream position of the throttle valve 6, and an inlet manifold 9 connected with an inlet port 8 is connected to a downstream side of the surge tank 7. The manifold 9 has an injector 10.

On the other hand, the inlet port 8 and an exhaust port 13, connected to a combustion chamber 12 of an engine 11, have an inlet valve 14 and an exhaust valve 15, opened/closed by a valve-operating mechanism (not shown), respectively. A spark plug (not shown) having a spark gap facing the combustion chamber 12 is attached to a cylinder head.

An upstream-side oxygen ($O_2$) sensor 17 as an A/F ratio sensor is provided at an exhaust path 16 connected to the exhaust port 13. A catalyst converter 18 (called catalyst) which renders toxic gas nontoxic is connected to the exhaust path 16. Further, a downstream-side $O_2$ sensor 20 also as an A/F ratio sensor is provided at an exhaust path 19 downstream of the catalyst converter 18. The catalyst converter 18 has a catalyst-temperature sensor 50 for detecting the temperature of the catalyst 18a. On the upstream side of the catalyst converter 18, an exhaust-gas temperature sensor 60 is provided. The exhaust-gas temperature sensor 60 is used for detecting the temperature of the catalyst in place of the catalyst-temperature sensor 50, as will be described later. The catalyst converter 18 is constituted by holding noble metals such as white gold and palladium, and transition metal elements such as cobalt, nickel, chrome, steel, copper, manganese, zinc and lead, as catalyst, on a honeycomb holder. The oxidization or deoxidization of the catalyst reacts and purifies toxic components such as CO, HC, NOx in exhaust gas.

A by-pass 21 is provided for by-passing the throttle valve 6. An ISC valve 22 as an ISC (Idle Speed Control) mechanism is provided at the by-pass 21. An inlet-temperature sensor 23 is provided on the downstream side of the element 2 of the air cleaner 1. A throttle sensor 24 is provided in the throttle body 4. Further, a water-temperature sensor 25 is provided in a water jacket.

On the other hand, an evaporation-fuel supply device 26 is constructed as follows. A fuel tank 27 and an inlet side of a canister 28 are connected via a first purge line 29. The first purge line 29 has a solenoid valve 30 which opens/closes only upon engine operation. An outlet side of the canister 28 and an inlet side of a purge valve 31 are connected via a second purge line 32. Further, an outlet side of the purge valve 31 and the surge tank 7 of the inlet system are connected via a third purge line 33. Thus the evaporation fuel in the fuel tank 27 is sucked into the canister 28, and introduced into the inlet system via the purge valve 31.

Note that output from the upstream $O_2$ sensor 17 is used for A/F ratio feed-back control, and outputs from the respective $O_2$ sensors 17 and 20 are used for determining degradation of the catalyst 18a of the catalyst converter 18.

<Construction of Control Circuit>

Next, the construction of a control circuit of the catalyst degradation determination apparatus will be described. FIG. 2 shows the controller of the catalyst degradation determination apparatus according to the embodiment.

In FIG. 2, a CPU 40 controls a failure-display lamp 36 and the injector 10 in accordance with programs stored in a ROM 35, based on the inlet-air amount Q from the air-flow sensor 3, engine revolutions Ne from a distributor 34, an engine water temperature tw from the water-temperature sensor 25, output voltages corresponding to A/F ratios from the upstream $O_2$ sensor 17 and the downstream $O_2$ sensor 20, respective output signals from the exhaust-gas temperature sensor 60, the catalyst-temperature sensor 50, a vehicle-velocity sensor 70, a throttle-valve opening sensor 80 and the like. A RAM 37 is used for storing necessary map as shown in FIG. 3 and data such as control-gain data upon catalyst degradation determination, control-gain data upon normal running.

FIG. 3 is an explanatory view of the map stored in the RAM 37. The map in FIG. 3 shows an area for the A/F ratio feed-back control, i.e., a feed-back zone, with the engine revolutions Ne as the horizontal axis and a load CE (CE= Q/Ne) as the vertical axis. In this embodiment, during the A/F ratio feed-back control, when the various input signal values reach a catalyst degradation judgment area, the A/F ratio feed-back control is stopped, and A/F ratio open-loop control is started. In the A/F ratio open-loop control, the A/F ratio is switched to the rich or lean sides, with a logical A/F ratio ($\lambda=1$) as the center, at a predetermined period. After A/F ratio feed-back control has been changed to the A/F ratio open-loop control, the catalyst degradation determination is performed.

Figure 13A:
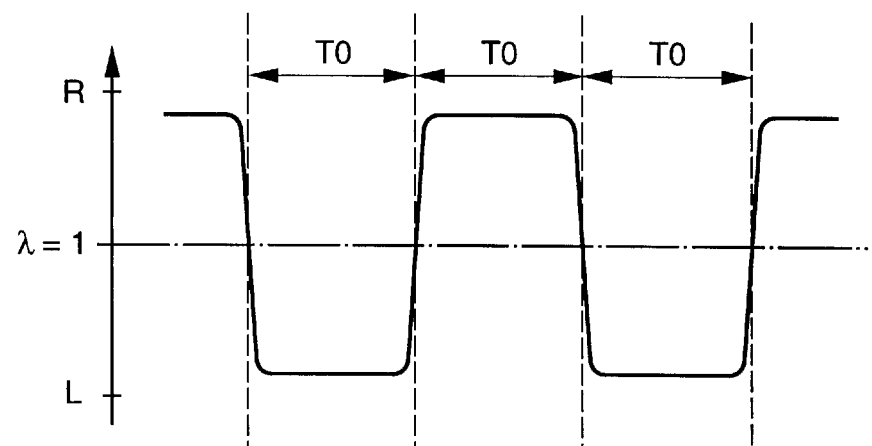
FIGS. 13A and 13B are timing charts explaining A/F ratio open-loop control.
Figure 13B:
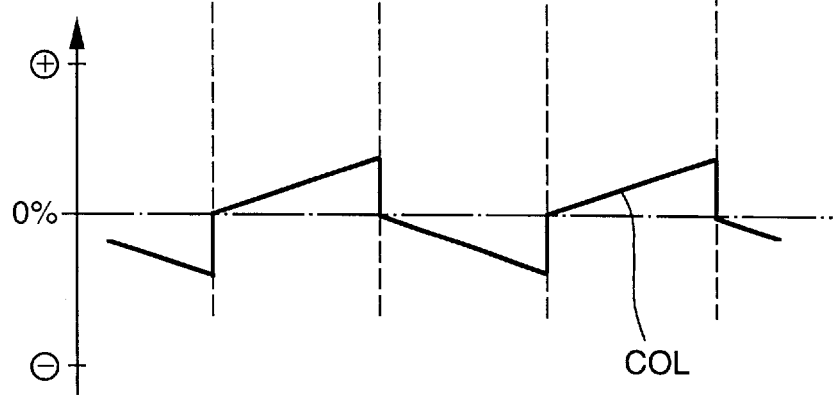

As shown in FIG. 13A, the A/F ratio open-loop control changes a open-loop control constant COL as shown in FIG. 13B to repeatedly switch the A/F ratio to rich (R) and lean (L) sides, with the logical A/F ratio ($\lambda=1$) as the center, at a predetermined period T0.

The CPU 40 has a function of comparing a integrated value of the output values of the upstream $O_2$ sensor 17 and that of the downstream $O_2$ sensor 20 to determine whether the catalyst 18a is degraded or not, a function of correcting a feed-back correction amount based on the difference between a target A/F ratio (e.g., A/F=14.7) and an actual A/F ratio so that the actual A/F ratio becomes closer to the target A/F ratio, and a function of determining whether or not the various input signal values have reached the degradation judgment area for determining the degradation of the catalyst 18a.

<Catalyst Degradation Determination>

Next, the catalyst degradation determination will be described.

In the catalyst degradation determination of this embodiment, during the A/F ratio feed-back control after starting of the engine, when it is determined that the various input signal values have reached the degradation judgment area, an integrated value of the output values of the upstream $O_2$ sensor 17 and that of the downstream $O_2$ sensor 20 are compared so as to determine degradation of the catalyst 18a, within this degradation judgment area. The degradation judgment area is determined within the A/F ratio feed-back control area, based on the engine revolutions, an engine-revolution change rate, a throttle-valve opening, a throttle-valve opening change rate, the engine load, an engine-load change rate, and a vehicle velocity. This degradation judgment area differs for manual transmission and automatic transmission. In manual transmission, settings may be: 2000<engine revolutions<4000 rpm, engine-revolution change rate<200 rpm/sec., 1/8<throttle-valve opening<3/8, 20<vehicle velocity<70 mph. Upon integration of the respective sensor outputs, when engine-drive status is out of the degradation judgment area, integrated values of the respective sensor outputs within the degradation judgment area at that time are stored. Then, when the engine-drive status is again within the degradation judgment area, integration of output values from the upstream $O_2$ sensor 17 and output values from the downstream $O_2$ sensor 20 is started with the previous values.

However, upon degradation determination, if the throttle is frequently opened/closed by acceleration operation by a driver, especially, when open-status of the throttle is changed to closed-status, the integrated value of the output values from the downstream $O_2$ sensor 20 is degraded with degradation of activated status of the catalyst, which causes erroneous detection.

Further, if the integrated value of the output values from the downstream $O_2$ sensor 20 has degraded in comparison with the previous values, erroneous detection may occur upon catalyst degradation determination.

In consideration of these problems, this embodiment performs judgment of activated status of the catalyst upon starting or restarting integration of output values from the respective $O_2$ sensors. If the status of the catalyst is approximately the same as the previous status, the integration of the output values from the $O_2$ sensors is re-started with the previous integrated values. If the status of the catalyst is different from the previous status, the previous integrated values are reset, and integration of the output values from the $O_2$ sensors is performed from the beginning. This prevents erroneous detection upon catalyst degradation determination.

Next, two concrete control procedures of catalyst degradation determination will be described as first and second embodiments.

[First Embodiment]

Figure 7:
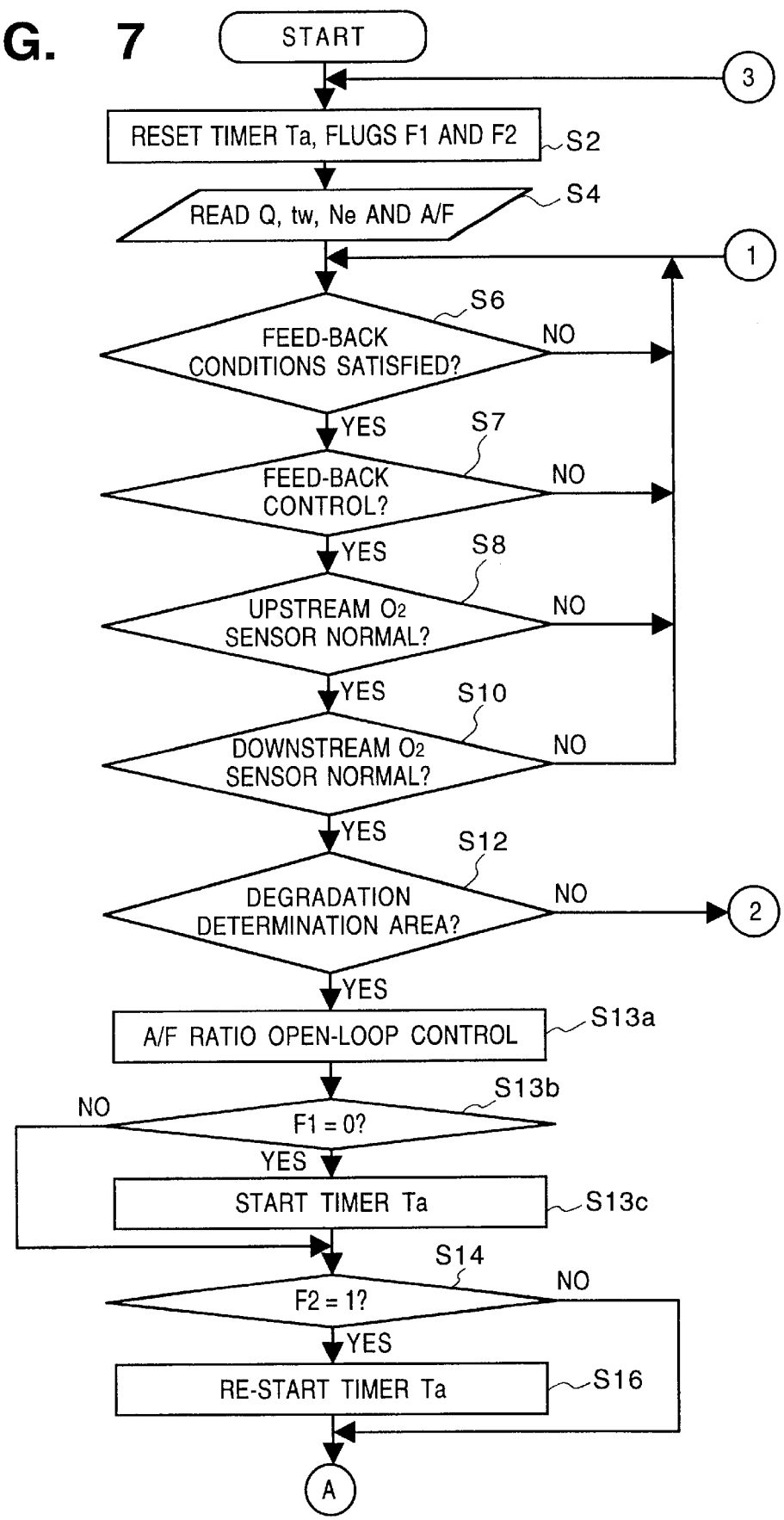
FIG. 7 is a flowchart showing a control procedure of catalyst degradation determination according to a first embodiment of the present invention.
Figure 8:
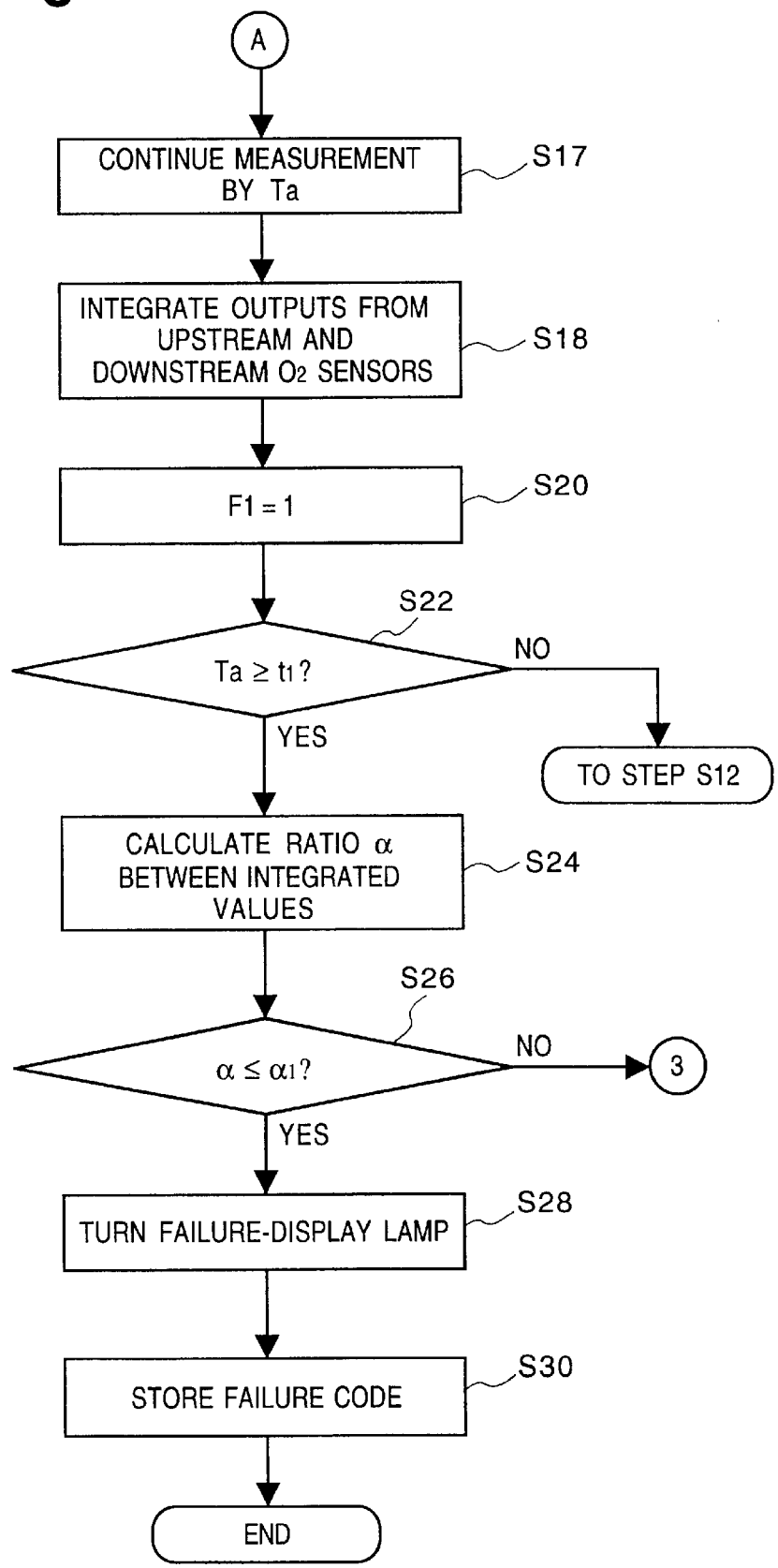
FIG. 8 is a flowchart showing a control procedure of catalyst degradation determination according to the first embodiment of the present invention.
Figure 9:
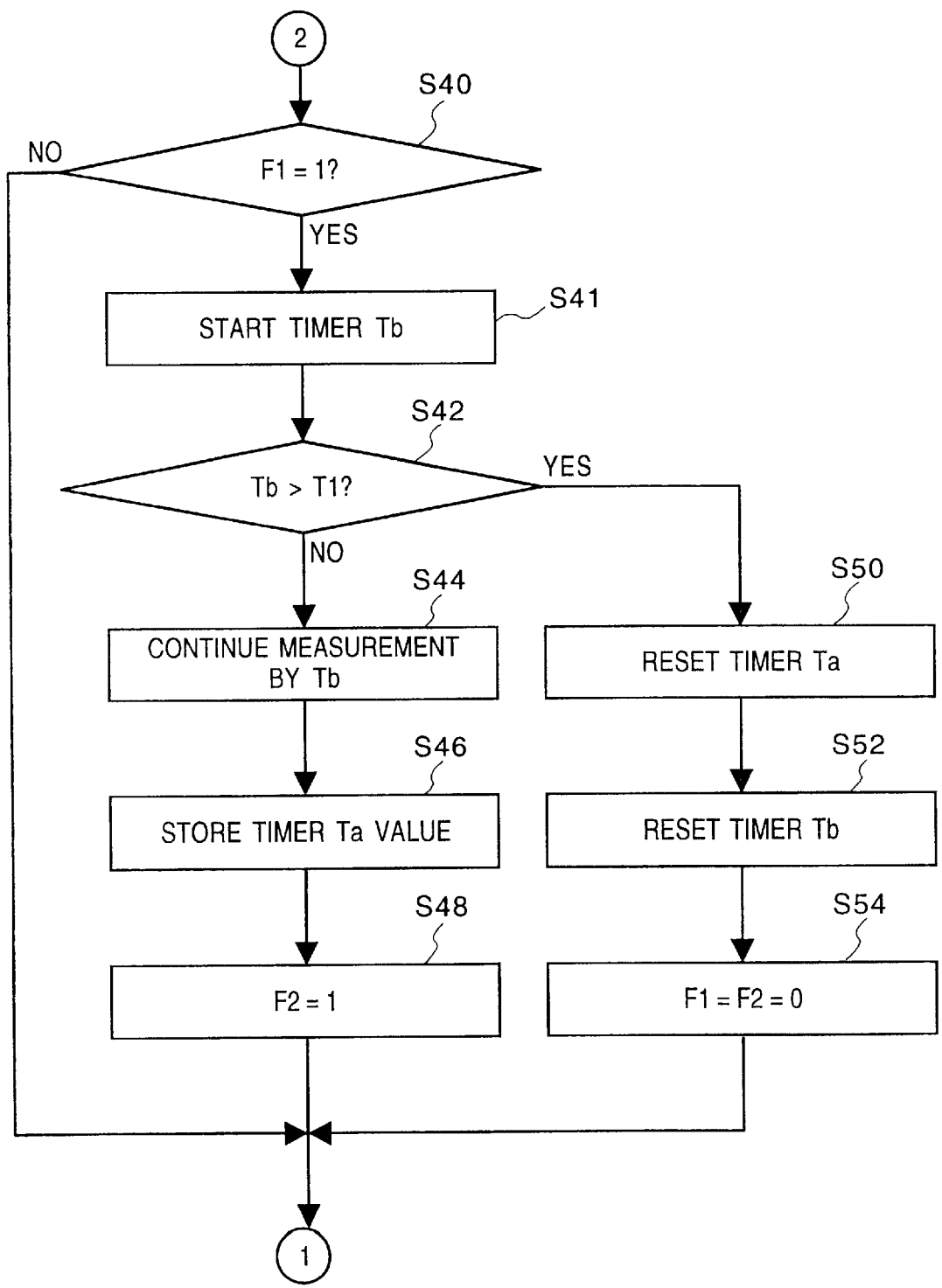
FIG. 9 is a flowchart showing a control procedure of catalyst degradation determination according to the first embodiment of the present invention.

First, the catalyst degradation determination according to the first embodiment will be described. FIGS. 7 to 9 are flowcharts showing the catalyst degradation determination according to the first embodiment.

In FIGS. 7 to 9, when processing is started, a timer Ta, flags F1 and F2 are reset at step S2. The timer Ta measures time since the various input signal values reached the catalyst degradation judgment area, to be described later. The flag F1 indicates the start of integration of the output values from the respective $O_2$ sensors. The flag F2 indicates that previous integrated values of the output values from the respective $O_2$ sensors are stored. At step S4, the CPU 40 reads necessary signals such as the inlet-air amount Q from the air-flow sensor 3, the engine water temperature tw from the water-temperature sensor 25, the engine revolutions Ne from the distributor 34, the output voltage corresponding to an A/F ratio (a solid line waveform a in FIG. 5A) from the upstream $O_2$ sensor 17, and the output voltage corresponding to an A/F ratio (a dotted-line waveform b in FIG. 5B) from the downstream $O_2$ sensor 20.

Next, at step S6, the CPU 40 determines whether or not feed-back conditions are satisfied. That is, the load CE is obtained by dividing the inlet-air amount Q by the engine revolutions Ne, and based on the obtained load CE and the engine revolutions Ne, it is determined whether or not sensor outputs have reached the feed-back zone in the map (FIG. 3). At this time, as combustivity is degraded when engine coolant is at a low temperature, it is determined whether or not the water temperature is at 40° C. or higher, for example. Further, as the exhaust-gas temperature must be 300° C. or higher, for example, to obtain a regular output from the upstream $O_2$ sensor 17, it is determined whether or not the upstream $O_2$ sensor 17 has been activated. That is, determining whether or not the feed-back conditions are satisfied is made based on a logical product of decision of within/without the feed-back zone, a predetermined or higher water temperature (40° C.), and activated/inactivated status of upstream $O_2$ sensor 17. If the feed-back conditions are not satisfied, the process returns, while if the conditions are satisfied, proceeds to step S7.

At step S7, the CPU 40 determines whether or not the A/F ratio feed-back control is currently being performed. If NO, the process returns, while if YES, proceeds to step S8.

At step S8, the CPU 40 determines whether or not the upstream $O_2$ sensor 17 outputs output normal voltage values. If NO, the process returns to step S4, while if YES, proceeds to step S10. At step S10, the CPU 40 determines whether or not the downstream $O_2$ sensor 20 outputs output normal voltage values. If NO, the process returns, while if YES, proceeds to step S12.

At step S12, the CPU 40 determines whether or not the various input signal values have reached the catalyst degradation judgment area. If NO, the process proceeds to step S40 to be described later in FIG. 9, while if YES, proceeds to step S13a.

At step S13a, the CPU 40 stops the A/F ratio feed-back control so as to execute the degradation judgment. The CPU 40 performs the A/F ratio open-loop control where the A/F ratio is switched to rich or lean side with a logical A/F ratio ($\lambda$=1) as the center at a predetermined period. At step S13b, it is determined whether or not the value of the flag F1 is "0", i.e., the integration of the output values from the respective $O_2$ sensors has not been started yet. If YES at step S13b, i.e., the integration has not been started, the process proceeds to step S13c, while if NO, i.e., the integration has been started, proceeds to step S14. At step S13c, the timer Ta is started.

At step S14, it is determined whether the value of the above-mentioned flag F2 is "1" or "0", i.e., whether or not the previous integrated values of the output values from the $O_2$ sensors are stored. If NO at step S14, the process proceeds to step S17 in FIG. 10, while if YES, proceeds to step S16. At step S16, the timer Ta is re-started so as to re-start measurement of a predetermined integration time t1. Then, the process proceeds to step S17.

Figure 6A:
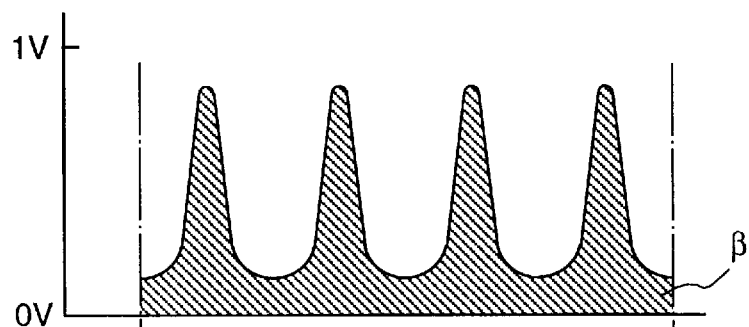
FIGS. 6A to 6C are graphs showing waveforms of output voltage from upstream and downstream A/F ratio sensors.
Figure 6B:
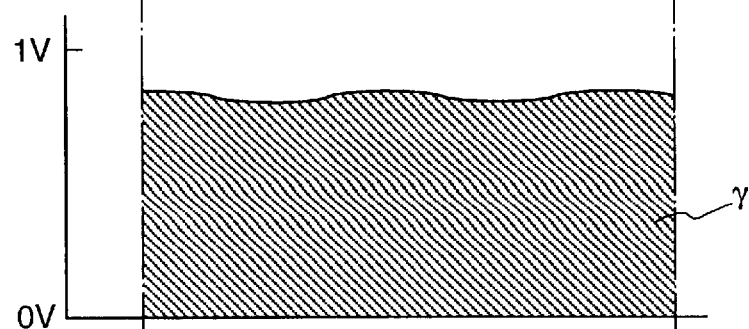
Figure 6C:
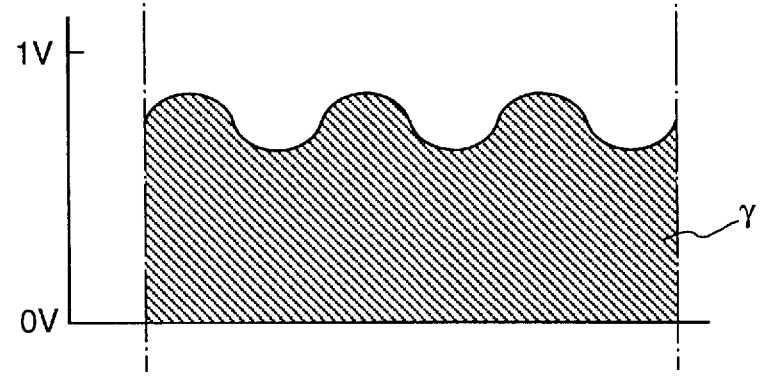

In FIG. 8, at step S17, the measurement of the timer Ta is continued, and the counting is re-started. At step S18, the CPU 40 integrates output values from the upstream $O_2$ sensor 17 and output values from the downstream $O_2$ sensor 20. If the timer Ta has been re-started at step S16, integration is re-started with the previous integrated values of output values from the respective $O_2$ sensors. If the timer Ta is simply started (no previous integrated value is stored, i.e., F2=0) at step S16, integration is started with integrated values of output values from the respective $O_2$ sensors. The integrated value $\beta$ of the output voltage from the upstream $O_2$ sensor 17 greatly decreases as shown in FIG. 6A. When the catalyst is not degraded, the integrated value $\gamma$ of the output voltage from the downstream $O_2$ sensor 20 is continuously on the rich side as shown in FIG. 6B. When the catalyst is degraded, the integrated value $\gamma$ of the output voltage from the downstream $O_2$ sensor 20 decreases as shown in FIG. 6C.

At step S20, the value of the flag F1 indicating start of the integration of output values from the respective $O_2$ sensors is set to "1", then the integration of the output values from the $O_2$ sensors is started. Thereafter, at step S22, it is determined whether or not the predetermined integrated time t1 (e.g., 7.2 sec) has elapsed since the timer Ta was started, i.e., the measurement has been made for the predetermined time t1 or longer. If NO at step S22, the process returns to step S12, while if YES, proceeds to step S24.

At step S24, the CPU 40 calculates a ratio $\alpha$ between the integrated value $\beta$ of the output values from the upstream $O_2$ sensor 17 and the integrated value $\gamma$ of the output values from the downstream $O_2$ sensor 20 ($\alpha=\gamma/\beta$) or a difference between these values ($\gamma-\beta$). At step S26, the CPU 40 determines whether or not the ratio $\alpha$ (or difference) equals a predetermined threshold value $\alpha 1$ (e.g., $\alpha 1$=1.14) or less. If NO at step S26, i.e., the integrated value $\gamma$ of the output values from the downstream $O_2$ sensor 20 is greater than the integrated value β of the output values from the upstream $O_2$ sensor 17, it is determined that the catalyst is in normal state, then the process returns to step S2. On the other hand, if YES at step S26, i.e., the integrated value β of the output values from the upstream $O_2$ sensor 17 and the integrated value γ of the output values from the downstream $O_2$ sensor 20 are close to each other, it is determined that the catalyst is degraded or is broken, then the process proceeds to step S28.

At step S28, the CPU 40 turns on the failure-display lamp 36 to inform the driver of degradation-breakdown of the catalyst 18a. Thereafter, at step S30, a failure code in case of degradation-breakdown is stored as maintenance data for the purpose of repair.

At step S12, upon determining whether or not the various input signal values have reached the degradation determination area, if NO, the process proceeds to step S40 in FIG. 9. At step S40, it is determined whether the value of the flag F1 is "1" or "0", i.e., the integration of the output values from the respective $O_2$ sensors has been started. If NO at step S40, the process returns to step S4. If YES, it is considered that there has been deviation from the degradation judgment area in the middle of the integration at step S18 (as F1=1, it is considered that the process has proceeded to step S20), then the process proceeds to step S41, at which a timer Tb is started. The timer Tb indicates a value of measurement of time from the deviation from the degradation judgment area. At step S42, it is determined whether or not a predetermined time T1 has elapsed since the timer Tb was started. If NO at step S42, the process proceeds to step S44, while if YES, proceeds to step S50.

At step S44, the measurement of the timer Tb is continued. At step S46, to add the timer value to the next integration time, the value of the timer Ta at the point where the deviation from the degradation judgment area has occurred and the integrated values of the output values from the respective $O_2$ sensors at that time are stored. Thereafter, at step S48, the value of the flag 2 is set to "1" to indicate that the integrated values of the output values from the respective $O_2$ sensors at the point where the value of the timer Ta was stored at step S46 are stored. Then the process returns to step S4.

On the other hand, at step S50, as the predetermined time T1 has elapsed since the timer Tb was started but the various input signal values have not returned to the degradation judgment area, the timer Tb is reset, and the integrated values of the output values from the respective $O_2$ sensors are cleared. Thereafter, the timer Tb is reset at step S52, and the flags F1 and F2 are reset to "0" at step S54. Then the process returns to step S4.

Figure 12:
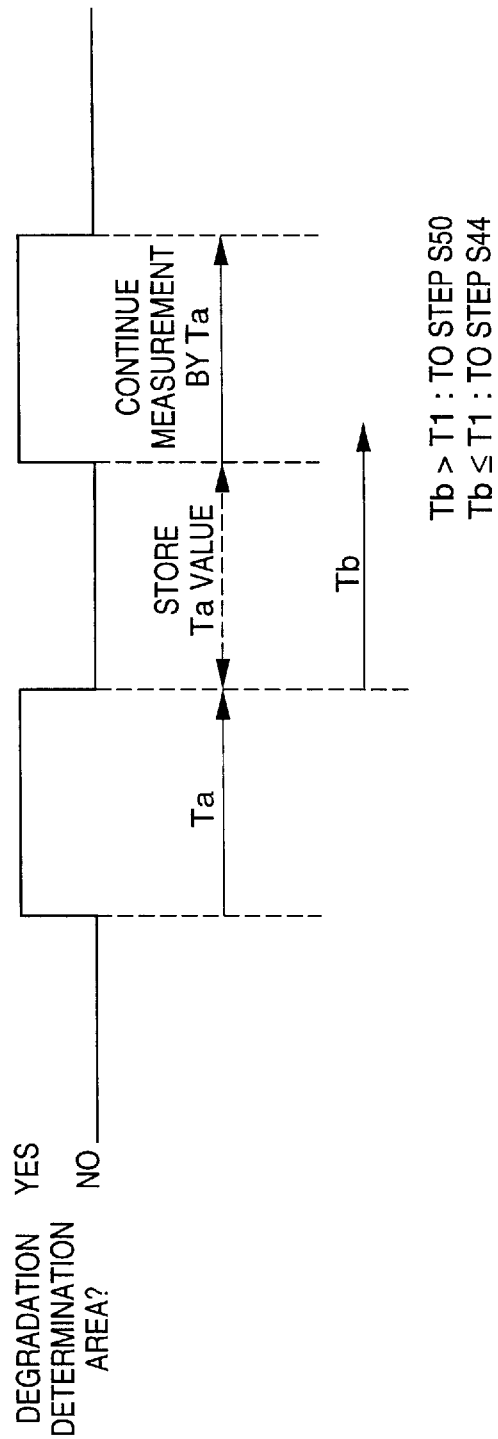
FIG. 12 is a timing chart showing the catalyst degradation determination according to the first embodiment.

Note that the above flowcharts are conceptualized by the timing chart shown in FIG. 12. That is, upon determining whether or not the various input signal values have reached the degradation judgment area, if YES at step S12, the timer Ta is started. If deviation from the degradation judgment area occurs before the predetermined time t1 has elapsed, the value of the timer Ta at this time is stored, and the timer Tb is started. If the predetermined time T1 has elapsed since the timer Tb was started (i.e., the count value of the Tb, indicative of time of storing the value of the timer Ta, has been the predetermined period T1), the process proceeds to step S50. If the predetermined time T1 has not elapsed since the timer Tb was started (i.e., the count value of the Tb, indicative of time of storing the value of the timer Ta, has not been the predetermined period T1), the process proceeds to step S44.

As described above, in the catalyst degradation determination procedure according to the first embodiment, as the various input signal values deviate from the degradation judgment area, integration of the output values from the respective $O_2$ sensors is temporarily stopped. Upon re-starting the integration, it is checked whether or not activated status of the catalyst has returned to a previous status. If it is determined that the catalyst status has returned to the previous status, integration of the output values from the respective $O_2$ sensors is started with previous integrated values. On the other hand, if it is determined that the catalyst status has not returned to the previous status within the predetermined time T1, the previous integrated values are reset, and integration of the $O_2$ sensor outputs is started from the beginning. This prevents erroneous catalyst degradation determination in a case where throttle-opening/closing is frequently made by acceleration operation by the driver.

[Second Embodiment]

Figure 10:
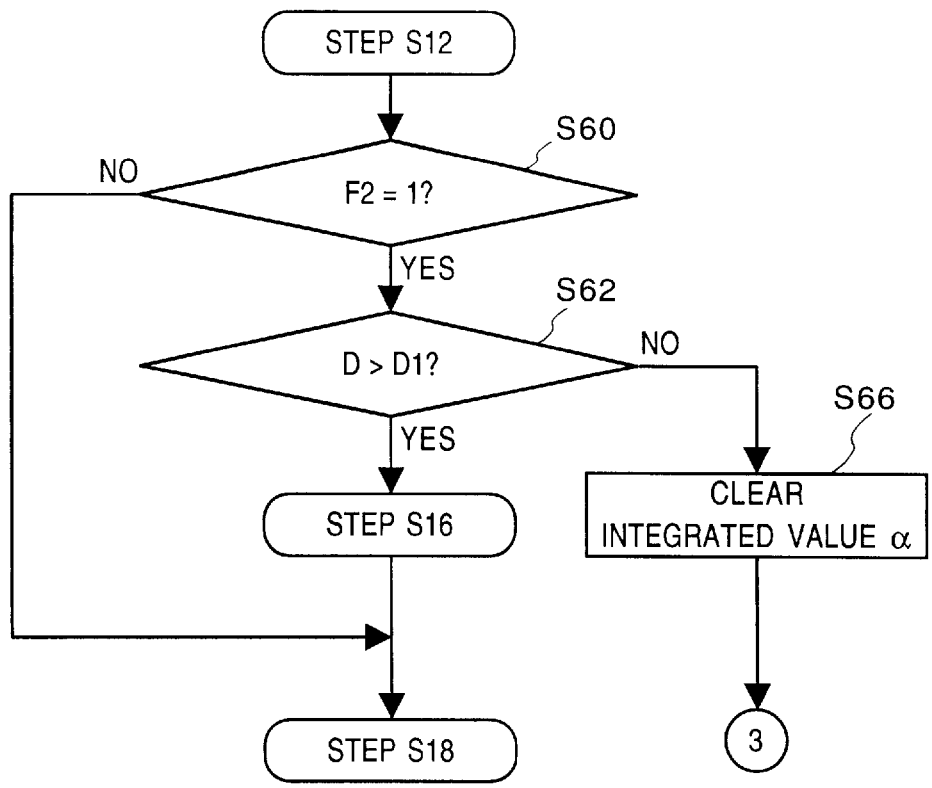
FIG. 10 is a flowchart showing a control procedure of catalyst degradation determination according to a second embodiment of the present invention.
Figure 11:
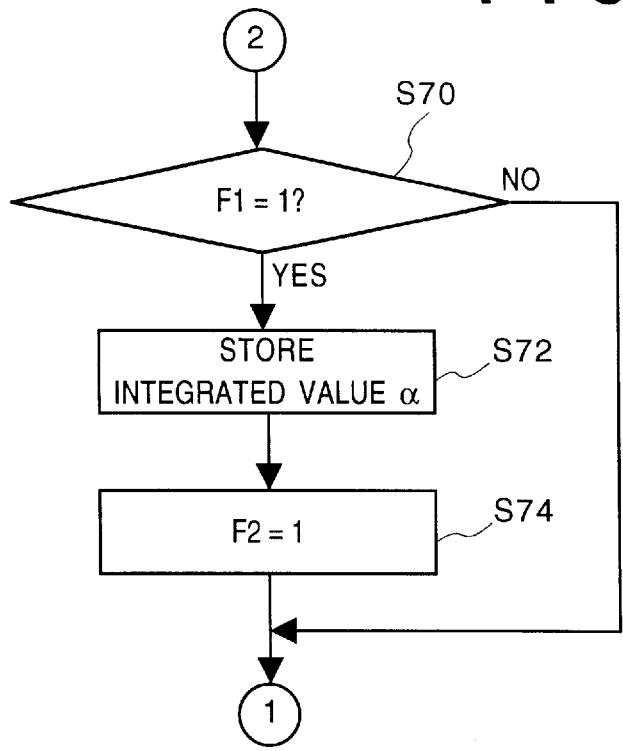
FIG. 11 is a flowchart showing a control procedure of catalyst degradation determination according to the second embodiment of the present invention.

Next, the catalyst degradation determination according to the second embodiment will be described. FIGS. 10 and 11 are flowcharts showing the catalyst degradation determination of the second embodiment.

In this degradation determination, whether or not sensor outputs are within the degradation judgment area is determined based on the temperature of the catalyst. The catalyst-temperature sensor 50 detects a catalyst temperature D. In a case where deviation from the degradation judgment area occurs and the integration of the output values from the respective $O_2$ sensors is temporarily stopped, when the integration is re-started, whether or not activated status of the catalyst has returned to a previous status is determined based on the catalyst temperature D. Note that in the following flowcharts, explanation of the steps corresponding to those in the first embodiment will be omitted, and only steps different from the first embodiment will be described.

In FIGS. 10 and 11, after step S12 in FIG. 7, the process proceeds to step S60, at which it is determined whether the value of the flag F2 is "1" or "0", i.e., the previous integrated values of the output values from the respective $O_2$ sensors are stored. If NO at step S60, the process proceeds to step S18 in FIG. 8, while if YES, proceeds to step S62. At step S62, it is determined whether or not the catalyst temperature D detected by the catalyst-temperature sensor 50 is greater than a predetermined threshold value D1. If YES at step S62, the process proceeds to step S16 in FIG. 7, while if NO, proceeds to step S66. At step S66, the stored integrated values are cleared, and the process returns to step S2. in FIG. 7.

Further, upon determining whether or not the various input signal values are within the degradation judgment area at step S12, if NO, the process proceeds to step S70 in FIG. 11. At step S70, it is determined whether the value of the flag F1 is "1" or "0", i.e., the integration of the output values from the respective $O_2$ sensors has been started. If NO at step S70, the process returns to step S4, while if YES, proceeds to step S72. If YES at step S70, as it is considered that deviation from the degradation judgment area has occurred in the middle of the integration at step S18, the integrated values of the output values from the respective $O_2$ sensors at this time are stored at step S72. Thereafter, at step S74, the flag F2 is set to "1" to indicate that the integrated values of the output values from the respective $O_2$ sensors at the point where the integrated values have been stored at step S72 are held. Then the process returns to step S4.

As described above, according to the catalyst degradation determination according to the second embodiment, as deviation from the degradation judgment area occurs, the integration of the output values from the respective $O_2$ sensors is temporarily stopped. When the integration is re-started, whether the activated status of the catalyst has returned to a previous status, based on the catalyst temperature D. If the previous catalyst status has been restored, integration of the output values from the respective $O_2$ sensors is started with the previous integrated values. On the other hand, if the catalyst status has not returned to the previous status, the previous integrated values are reset, and the integration of the outputs from the $O_2$ sensors is started from the beginning. This prevents erroneous catalyst degradation determination in a case where throttle opening/closing is frequently made by acceleration operation by the driver.

Note that the predetermined time periods t1 and T1, the threshold values α1, and the catalyst temperature threshold value D1 can be arbitrarily set.

Further, in the second embodiment, the temperature of the catalyst can be obtained by using the exhaust-gas temperature sensor 60 instead of the catalyst-temperature sensor 50.

As described above, according to the present invention, when predetermined degradation determination conditions are satisfied, output values from A/F ratio sensors respectively provided at the upstream and downstream of an exhaust-purifying catalyst are integrated. Catalyst degradation is detected by comparing the respective integrated values. During integration of the output values from the respective A/F ratio sensors, when the predetermined degradation determination conditions are not satisfied, the integrated values at that point are stored. When the conditions are satisfied again, the integration of the output values is re-started with the stored integrated values. Then activated status of the catalyst is determined based on the result of comparison of the integrated values. The stored integrated values are cleared in accordance with the result of the activated status determination. This prevents erroneous catalyst degradation determination, and improves degradation determination precision by ensuring a number of times of detection in the degradation judgment area by detecting degradation in accordance with change of the activated status of the catalyst.

Further, according to the present invention, in the above construction, in a case where the predetermined detection conditions are not satisfied, if a predetermined time has elapsed since the predetermined detection conditions were not satisfied, the stored integrated values are cleared. This also prevents erroneous catalyst degradation determination, and improves degradation determination precision by ensuring a number of detection times in the degradation judgment area by detecting degradation in accordance with change of the activated status of the catalyst.

The present invention is not limited to the above embodiments and various changes and modifications can be made within the spirit and scope of the present invention. Therefore, to appraise the public of the scope of the present invention, the following claims are made.

What is claimed is:

1. A catalyst degradation determination apparatus comprising:

an exhaust-purifying catalyst arranged in an exhaust passage;

upstream air by fuel ratio detection means provided at an upstream position, for detecting the air by fuel ratio;

downstream air by fuel ratio detection means provided at a downstream position, for detecting the air by fuel ratio;

engine condition detection means for detecting the driving condition of an engine;

degradation determination condition judgment means for judging a predetermined degradation determination condition of the exhaust-purifying catalyst, based on the driving condition of the engine;

catalyst degradation judgment means for judging the degradation of the exhaust-purifying catalyst when the predetermined degradation conditions are satisfied, based on a ratio by each condition value of output values of the upstream air by fuel ratio detection means and the downstream air by fuel ratio detection means during a predetermined period;

holding means for holding the condition values of output values of the upstream air by fuel ratio detection means and the downstream air by fuel ratio detection means when the predetermined degradation determination conditions are not satisfied during the judgment of the catalyst degradation during the predetermined period; and catalyst judgment means for judging activated status of the exhaust-purifying catalyst;

wherein said catalyst degradation judgment means judges the degradation of the exhaust-purifying catalyst based on the condition values when the predetermined degradation determination conditions are satisfied once again after the catalyst judgment means judges the activated status of the exhaust-purifying catalyst continuously during the period when the holding means holds the condition values.

2. The catalyst degradation determination apparatus according to claim 1, further comprising catalyst-temperature detection means for detecting a temperature of said exhaust-purifying catalyst, wherein said catalyst judgment means judges the activated status of said exhaust-purifying catalyst based on a detection value from said catalyst-temperature detection means.

3. The catalyst degradation determination apparatus according to claim 2, further comprising a clearing means for clearing the values held by the holding means, wherein if the temperature of said exhaust-purifying catalyst has changed, from a point where the predetermined degradation determination conditions were not satisfied, to a predetermined value or greater, said clearing means clears the values held by said holding means.

4. The catalyst degradation determination apparatus according to claim 1, further comprising:

air by fuel ratio feed-back control means for calculating a control characteristic based on the output values from said respective air by fuel ratio detection means, and feed-back controlling an air by fuel ratio of airfuel mixture supplied to a gas cylinder of an engine to a target value;

air by fuel ratio open-loop control means for performing open-loop control to switch a fuel-injection amount to a rich-mixture value or a lean-mixture value at a predetermined period with a logical air by fuel ratio as a reference; and control switching means for, when the degradation determination conditions are satisfied, stopping control by said air by fuel ratio feed-back control means and performing control by said ratio open-loop control means.

5. The catalyst degradation determination apparatus according to claim 1, further comprising exhaust-temperature detection means for detecting a temperature of exhaust gas, wherein said catalyst judgment means judges the activated status of said exhaust-purifying catalyst based on a detection value from said exhaust-temperature detection means.

6. The catalyst degradation determination apparatus according to claim 1, wherein said exhaust-purifying catalyst comprises a noble-metal component as a catalyst on a predetermined honeycomb holder.

7. A catalyst degradation determination apparatus according to claim 1, wherein said catalyst degradation judgment means judges the degradation of the exhaust-purifying catalyst based on a ratio by each integrated value of output values of the upstream air by fuel ratio detection means and the downstream air by fuel ratio detection means during a predetermined period.

8. A catalyst degradation determination apparatus comprising:

an exhaust-purifying catalyst arranged in an exhaust passage;

upstream air by fuel ratio detection means provided at an upstream position, for detecting the air by fuel ratio;

downstream air by fuel ratio detection means provided at a downstream position, for detecting the air by fuel ratio;

engine condition detection means for detecting the driving condition of an engine;

degradation determination condition judgment means for judging a predetermined degradation determination condition of the exhaust-purifying catalyst, based on the driving condition of the engine;

catalyst degradation judgment means for judging the degradation of the exhaust-purifying catalyst when the predetermined degradation determination conditions are satisfied, based on a ratio by each condition value of output values of the upstream air by fuel ratio detection means and the downstream air by fuel ratio detection means during a predetermined period; and holding means for holding the condition values of output values of the upstream air by fuel ratio detection means and the downstream air by fuel ratio detection means when the predetermined degradation determination conditions are not satisfied during the judgment of the catalyst degradation during the predetermined period;

wherein said catalyst degradation judgment means judges the degradation of the exhaust-purifying catalyst based on the condition values when the predetermined degradation determination conditions are again satisfied during a predetermined period after the predetermined degradation determination conditions are not satisfied.

9. The catalyst degradation determination apparatus according to claim 8, wherein said predetermined period is a period wherein a temperature of said exhaust-purifying catalyst can be maintained at a predetermined level or higher.

10. The catalyst degradation determination apparatus according to claim 8, further comprising:

air by fuel ratio feed-back control means for calculating a control characteristic based on the output values from said respective air by fuel ratio detection means, and feed-back controlling an air by fuel ratio of airfuel mixture supplied to a gas cylinder of an engine to a target value;

air by fuel ratio open-loop control means for performing open-loop control to switch a fuel-injection amount to a rich-mixture value or a lean-mixture value at a predetermined period with a logical air by fuel ratio as a reference; and control switching means for stopping control by said air by fuel ratio feed-back control means and starting control by said logical air by fuel ratio feed-back control means when the degradation determination conditions are satisfied.

11. A catalyst degradation determination apparatus, comprising:

an exhaust-purifying catalyst arranged to an exhaust passage;

an upstream oxygen sensor provided at an upstream position for detecting air by fuel ratio;

a downstream oxygen sensor provided at a downstream position for detecting the air by fuel ratio;

an engine condition detection sensor for detecting a driving condition of an engine;

a controller for judging a predetermined degradation determination condition of the exhaust-purifying catalyst based on the driving condition of the engine, and for judging the degradation of the exhaust-purifying catalyst when the predetermined degradation determination conditions are satisfied, based on a ratio by each condition value of output values of the upstream oxygen sensor and the downstream oxygen sensor during a predetermined period;

wherein said controller holds the condition values of output values of the upstream oxygen sensor and the downstream oxygen sensor when the predetermined degradation determination conditions are not satisfied during the judgment of the catalyst degradation during the predetermined period, and judges the degradation of the exhaust-purifying catalyst based on the condition values when the predetermined degradation determination conditions are again satisfied after an activated status of the exhaust-purifying catalyst are judged continuously while holding the condition values.

12. A catalyst degradation determination apparatus, comprising:

an exhaust-purifying catalyst arranged to an exhaust passage;

an upstream oxygen sensor provided at an upstream position for detecting air by fuel ratio;

a downstream oxygen sensor provided at a downstream position for detecting the air by fuel ratio;

an engine condition detection sensor for detecting a driving condition of an engine;

a controller for judging a predetermined degradation determination condition of the exhaust-purifying catalyst, based on the driving condition of the engine, and for judging the degradation of the exhaust-purifying catalyst when the predetermined degradation determination conditions are satisfied, based on a ratio by each condition value of output values of the upstream oxygen sensor and the downstream oxygen sensor during a predetermined period;

wherein said controller holds the condition values of output values of the upstream oxygen sensor and the downstream oxygen sensor when the predetermined degradation determination conditions are not satisfied during the judgment of the catalyst degradation during the predetermined period, and judges the degradation of the exhaust-purifying catalyst based on the condition values when the predetermined degradation determination conditions are again satisfied during a predetermined period after the predetermined degradation determination conditions are not satisfied.

13. A catalyst degradation determination method employing A/F ratio sensors respectively provided at an upstream position and a downstream position of an exhaust-purifying catalyst, integrating output values from said respective A/F ratio sensors when predetermined degradation determination conditions are satisfied, and detecting degradation of said exhaust-purifying catalyst by comparing the respective integrated values, comprising:

- a holding step of holding integrated values when the predetermined degradation determination conditions are not satisfied during integration of the output values from said respective A/F ratio sensors;
- an integration step of re-starting the integration of the output values with the integrated values held at said holding step when the predetermined degradation determination conditions are satisfied again; and
- a clearing step of clearing the integrated values held at said holding step if a predetermined period has elapsed since the predetermined degradation determination conditions were not satisfied.

14. The catalyst degradation determination method according to claim 13, wherein said predetermined period is pre-set to a period where a temperature of said exhaust-purifying catalyst can be maintained at a predetermined level or higher.

15. The catalyst degradation determination method according to claim 13, further comprising a control switching step of calculating a control characteristic based on the output values from said respective A/F ratio sensors when the predetermined degradation determination conditions are satisfied, then stopping feed-back control to control an A/F ratio of air-fuel mixture supplied to a gas cylinder of an engine to a target value, and starting A/F ratio open-loop control to switch a fuel-injection amount to a rich-mixture value or a lean-mixture value at a predetermined period with a logical A/F ratio as a reference.

* * * * *

UNITED STATES PATENT AND TRADEMARK OFFICE
CERTIFICATE OF CORRECTION

PATENT NO. : 5,851,376
DATED : December 22, 1998
INVENTOR(S) : Futoshi Nishioka, et al.

It is certified that error appears in the above-identified patent and that said Letters Patent is hereby corrected as shown below:

On the title page, insert the following:

[30] Foreign Application Priority Data, include:
--Nov. 20, 1995 [JP] Japan    7-301636--
--Nov. 12, 1996 [JP] Japan    8-300455--.

Signed and Sealed this

Twenty-first Day of December, 1999

Attest:

Q. TODD DICKINSON

Attesting Officer

Acting Commissioner of Patents and Trademarks